March 15, 1932.　　　L. V. ANDREWS　　　1,849,395

VALVE

Filed March 12, 1930

WITNESS
A. G. Blodgett

INVENTOR
L. V. ANDREWS
BY Clayton H. Jenks
ATTORNEY

Patented Mar. 15, 1932

1,849,395

UNITED STATES PATENT OFFICE

L. V. ANDREWS, OF WORCESTER, MASSACHUSETTS, ASSIGNOR TO RILEY STOKER CORPORATION, OF WORCESTER, MASSACHUSETTS, A CORPORATION OF MASSACHUSETTS

VALVE

Application filed March 12, 1930. Serial No. 435,322.

This invention relates to valves, and more particularly to stop valves arranged to be mounted in conduits through which pulverized coal is transported on a current of air.

In steam power plants utilizing pulverized coal as a fuel it is frequently necessary to provide stop valves in the various pipes leading from the pulverizers or storage bins to the furnace burners, in order that particular burners may be shut down when desired. It is very important that such valves should close tightly and be free from leakage, either along the pipe line or into the boiler room, since a leaky pulverized coal valve creates a serious explosion hazard. The fuel used in modern plants is pulverized to such an extremely fine degree and will pass through such minute openings that great difficulty has been encountered in constructing valves which are satisfactory in this respect. Valves used in this service frequently remain untouched for long periods, and when it becomes necessary to open or close them it is found that they are stuck fast by the wedging and hardening of the coal around the movable parts.

It is accordingly the main object of my invention to provide a stop valve for use in a conduit for pulverized coal and air which will serve to close the conduit tightly when desired and prevent all leakage, and which may be easily operated at any time even though it may have stood idle for a long period.

It is a further object of my invention to provide a stop valve which is simple and inexpensive to manufacture and install, and thoroughly dependable in operation.

With these and other objects in view, as will be apparent to those skilled in the art, my invention resides in the combination of parts set forth in the specification and covered by the claims appended hereto.

In accordance with my invention, I provide a valve construction comprising a valve member which is rotatably mounted in a stationary body portion. The valve member has a passage therethrough which may be brought into register with openings in the body portion to permit flow, or out of register to prevent flow. In order to prevent leakage, both internal and external, I provide grooves across which any possible leakage must occur, and I provide means for introducing grease at high pressure into the grooves to seal them and to lubricate the valve. External leakage is preferably prevented by means of an annular groove adjacent to one or both ends of the rotary valve member, and internal leakage by means of straight grooves extending parallel to the axis of the valve member.

Referring to the drawings illustrating one embodiment of the invention, and in which like reference numerals indicate like parts:

Figure 4:
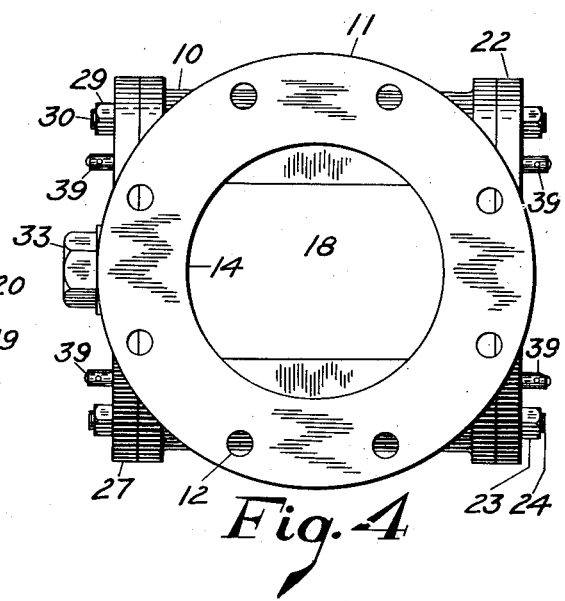
Fig. 4 is an end elevation.

The embodiment illustrated comprises a valve body portion or casing 10 which is so constructed that it may be conveniently mounted in a pipe line. For this purpose I have shown flanges 11 at each end of the body portion which have bolt holes 12 (Fig. 4) therein to permit ready connection of the structure to similar flanges on the pipe line. The casing 10 is made hollow as illustrated, thereby providing aligned openings 14 at its opposite ends through which the material to be conveyed in the pipe line may flow. These openings 14 are circular at their outer ends as shown in Fig. 4, to match the openings in the pipe line.

A valve member 16 is mounted within the casing 10 intermediate its ends, and arranged to be rotated about an axis transverse to the direction of flow through the casing. This valve member may be shaped as a cylinder fitting closely in an opening within the casing and provided with a diametrical passage 18 therethrough, preferably rectangular in cross section, which may be turned to register with openings 14. These openings change smoothly and gradually from a circular cross-section at their outer ends to a rectangular cross-section at their inner ends of the same size and shape as the passage 18. The passage 18 is of substantially the same cross sectional area as the pipe line in which the valve is to be mounted, in order that there may be no appreciable restriction of the flow when the valve is open. The side portions of the valve 16 are preferably cut away intermediate the ends of the valve as shown at 19, and the adjacent portions of the casing are likewise cut away at 20, in order to reduce the area of the contacting surfaces and thus avoid excessive friction and the possibility of pulverized coal jamming between the parts. The valve member as so constructed contacts with the body portion along four straight narrow strips located closely adjacent to the edges of the passage 18. This construction also decreases the weight of the structure and permits a more uniform thickness for the parts, which is an advantage when they are made by a casting operation.

Figure 2:
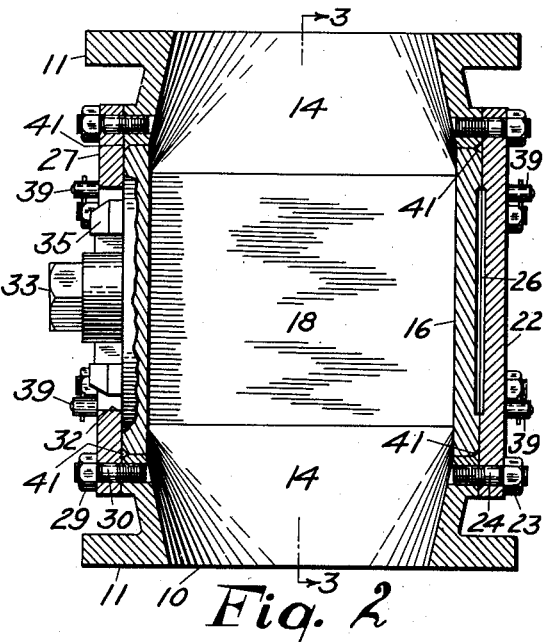
Fig. 2 is a section on the line 2—2 of Fig. 1, certain parts being shown in full for clearness of illustration.

The cylindrical opening in which the valve member 16 is mounted preferably extends entirely through the casing 10, as shown in Fig. 2, and is closed at one end by a flat circular plate 22. This construction greatly simplifies the machining operation on the casing. Plate 22 may be fastened to the casing by any suitable means, such as nuts 23 and studs 24. The adjacent faces of the plate 22 and the valve member 16 are preferably cut away at 26 so that these parts contact only over a narrow annular surface near the edge of the valve member. A flat annular plate 27 is fastened to the casing 10 at the opposite end of the valve 16 by means of nuts 29 and studs 30. The central opening 32 in the plate 27 is of a smaller diameter than the end of the valve, so that the plate overlies the valve and prevents it from moving axially. A hexagonal, or otherwise suitably formed, projection 33 extends axially from the valve at the end adjacent the plate 27, and serves as a convenient means for applying a wrench or handle to operate the valve. Diametrically opposite projections 35 on the same end of the valve serve as indicators to show the position of the valve, and also form stops which cooperate with an inwardly extending projection 36 on the plate 27 to limit the total movement of the valve to 90 degrees.

Figure 3:
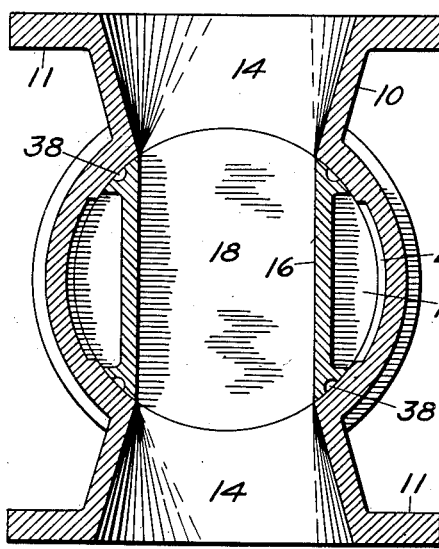
Fig. 3 is a section on the line 3—3 of Fig. 2.

In order to effectually prevent leakage of the valve, both internal and external, and at the same time thoroughly lubricate all relatively movable contacting surfaces, I provide a number of grooves through which grease may be forced under high pressure and which are so arranged that any possible leakage would have to take place across one of the grooves. In the preferred embodiment illustrated I have shown four grooves 38 (Fig. 3) extending parallel to the axis of the valve member 16 and located in those portions of its peripheral surface which contact with the casing. These grooves 38 are all equally spaced from each other and may be supplied with grease under pressure by any suitable means, such as "Alemite" fittings 39 of well known construction mounted on one or both of plates 22 and 27 in line with the grooves. With this arrangement the Alemite fittings will be in line with the grooves so long as the valve is either fully open or fully closed. In most cases I have found it desirable to provide the fittings at both ends of the grooves to ensure the distribution of the grease along their entire lengths. At one end and preferably both ends of the valve I provide an annular groove 41 (Fig. 2) having such a diameter that it registers with the fittings 39 and the grooves 38. These annular grooves 41 may be conveniently formed by chamfering the adjacent corners of the valve and the casing at approximately a 45 degree angle.

Figure 1:
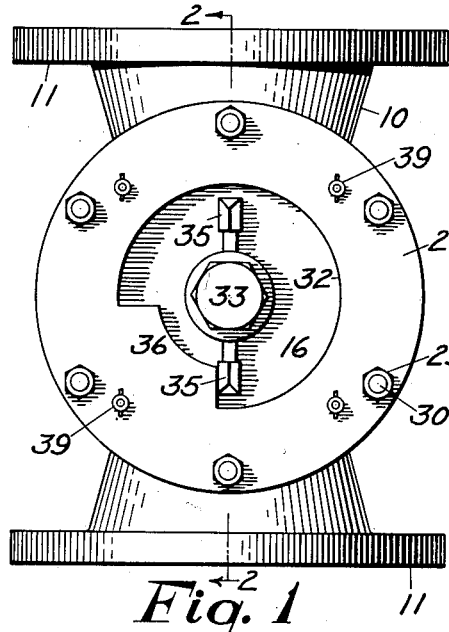
Fig. 1 is a side elevation of my improved valve.

The operation of the invention will now be apparent from the above disclosure. The valve is shown in the drawings in its fully open position, and the stream of pulverized fuel and air may flow freely through the openings 14 and 18. When it is desired to close the valve, a wrench is applied to the projection 33 and the valve is turned through an angle of 90 degrees in a counter-clockwise direction in Fig. 1, the movement being limited by contact of upper stop 35 with projection 36. This will bring opening 18 out of register with the openings 14 in the valve body, and thus cut off the flow. Grease is now forced into the grooves 38 and 41 by applying a suitable high pressure grease gun to the Alemite fittings 39. This forms a film of grease over all the contacting surfaces and prevents any leakage of pulverized coal, either along the pipe line or externally into the boiler room. Moreover the grease lubricates the parts and prevents the fine coal from working between the relatively movable surfaces, so that the valve may be easily operated even after a long period of idleness.

The valve is inexpensive to manufacture, since it is formed of few parts and the necessary machine work is of a simple character. There are no complicated and delicate mechanisms to give trouble, and the valve will operate with entire satisfaction through a long life of usefulness.

Having thus described my invention, what I claim as new and desire to secure by Letters Patent is:

1. A stop valve for a powdered coal pipe line comprising a body portion which is so constructed that it may be mounted in the pipe line and which has two openings therein through which flow may take place, a cylindrical valve member mounted in the body portion and arranged for rotation about an axis transverse to the direction of flow, said valve member having a straight passage therethrough of rectangular cross-section which may be brought into register with the openings in the body portion and thereby permit a direct uninterrupted flow of the coal, said valve member being cut away on opposite sides and arranged to contact with the body portion along four straight narrow strips located closely adjacent to the edges of the rectangular passage, and means to supply grease under pressure along each of said strips and thereby force out any pulverized coal which may become wedged between the contacting surfaces.

2. A stop valve for a powdered coal pipe line comprising a body portion which is so constructed that it may be mounted in the pipe line and which has two opposite openings therein through which flow may take place, a cylindrical valve member mounted in the body portion and arranged for rotation about an axis transverse to the direction of flow, said valve member having a straight passage therethrough of rectangular cross-section which may be brought into register with the openings in the body portion and thereby permit a direct uninterrupted flow of the coal, said valve member being cut away on opposite sides and arranged to contact with the body portion along four straight narrow strips located closely adjacent to the edges of the rectangular passage, each of said strips on the valve member having a groove extending along its surface, and a high pressure lubricating fitting in direct line with each groove when the valve member is in either extreme position.

3. A stop valve for a powdered coal pipe line comprising a body portion having a transverse cylindrical opening extending entirely therethrough, a cylindrical valve member mounted in the opening and arranged for rotation about its axis through an angle of ninety degrees, said valve member having a diametrical passage of rectangular cross-section therethrough and the body portion being shaped to provide two opposite passages which register with the valve member passage when the valve is open, each of the passages in the body portion having a circular cross-section at its outer end which changes smoothly and gradually to a rectangular cross-section at the inner end of the passage of the same shape as the valve member passage, the side portions of the valve member being cut away intermediate its ends and the parts of the body portion adjacent thereto when the valve is open being likewise cut away to leave four straight narrow strips for contact between the valve member and the body portion close to the edges of the rectangular valve member passage, the contacting surfaces being shaped to provide lubricant ducts extending along the strips, means to force lubricant along the ducts when the valve member is in either extreme position, a flat circular plate fastened to the body portion and closing one end of the cylindrical opening therethrough, and an annular plate fastened to the body portion and overlying the other end of the valve member.

Signed at Ponca City, Oklahoma, this 8th day of March, 1930.

L. V. ANDREWS.